M. SCHEDLBAUER.
VEHICLE WHEEL.
APPLICATION FILED MAR. 5, 1918.
1,290,788.
Patented Jan. 7, 1919.
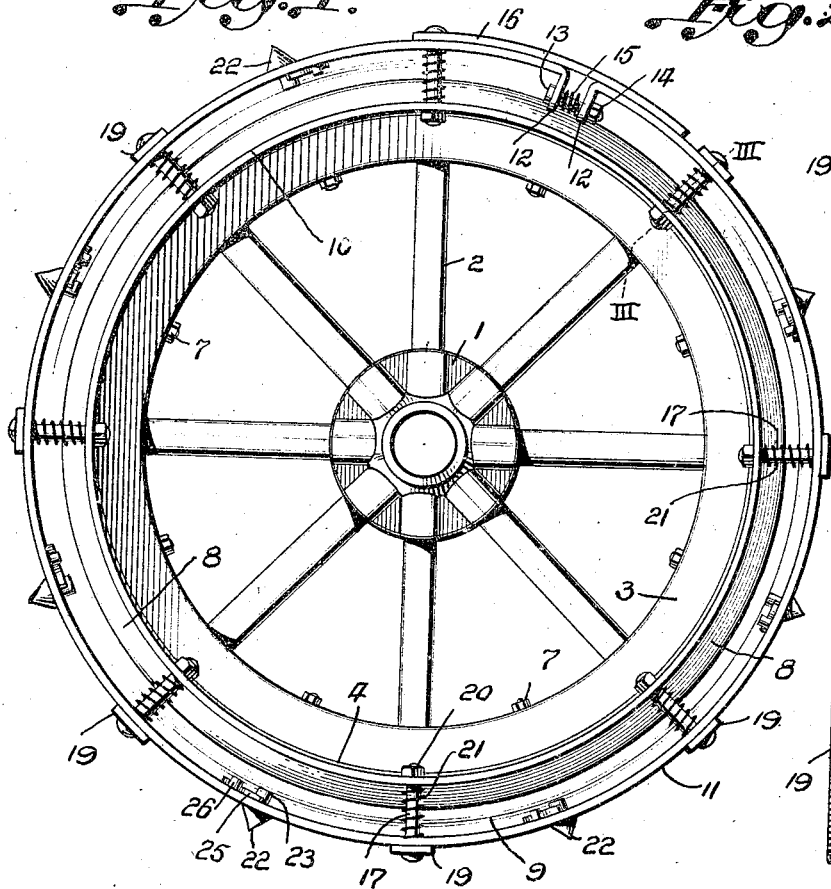
Fig. 1.
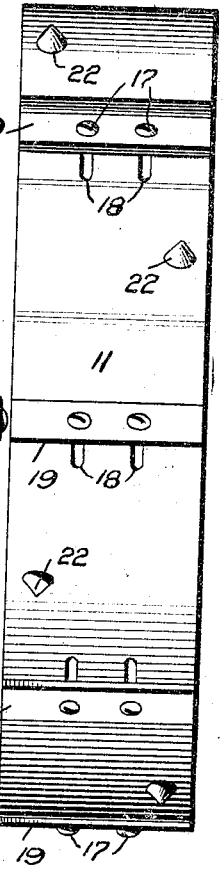
Fig. 2.
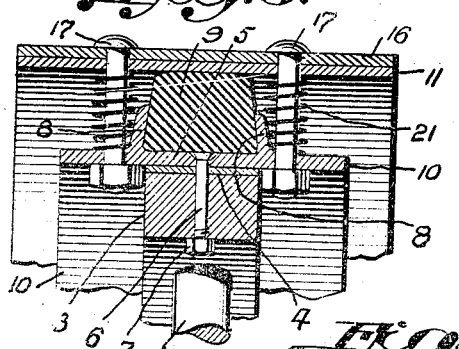
Fig. 3.
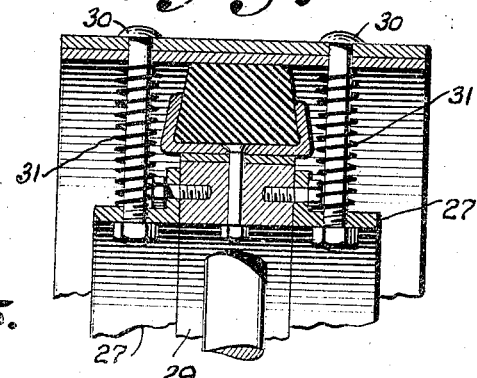
Fig. 4.
Fig. 5.
Inventor;
Michael Schedlbauer,
By
Attys.

UNITED STATES PATENT OFFICE.

MICHAEL SCHEDLBAUER, OF WARREN, MICHIGAN.

VEHICLE-WHEEL.

1,290,788.  Specification of Letters Patent.  Patented Jan. 7, 1919.

Application filed March 5, 1918. Serial No. 220,630.

*To all whom it may concern:*

Be it known that I, MICHAEL SCHEDLBAUER, a citizen of the United States of America, residing at Warren, in the county of Macomb and State of Michigan, have invented certain new and useful Improvements in Vehicle-Wheels, of which the following is a specification, reference being had therein to the accompanying drawings.

This invention relates to vehicle wheels, and has special reference to that type of wheel used in connection with automobiles, trucks and similar vehicles, and generally equipped with a pneumatic or solid rubber tire.

The primary object of my invention is to provide novel means in a manner as hereinafter set forth for converting a light duty wheel of the above type into a heavy duty wheel, as far as the traction of the wheel is concerned, so that a narrow tread wheel can be used on soft or irregular ground.

Another object of my invention is to furnish a wheel of the above type with a detachable annular tread member that will not only increase the tractive power of the wheel, but provide a resilient periphery that will coöperate with the resilient tire of the wheel in cushioning the body thereof or a load supported by the wheel.

A further object of my invention is to provide a vehicle wheel with a tread attachment wherein the parts are constructed and arranged to permit of the tread attachment being easily and quickly placed in position, without any danger of the attachment becoming accidentally displaced in the operation of the wheel.

The above and other objects are attained by a mechanical construction that will be hereinafter described and then claimed, and reference will now be had to the drawing, wherein—

Figure 1 is a side elevation of the wheel;
Fig. 2 is a tread elevation of the same;
Fig. 3 is an enlarged cross sectional view taken on the line III—III of Fig. 1;
Fig. 4 is a similar view illustrating a modification of my invention, and
Fig. 5 is a perspective view of a portion of the tread member, showing a spur retaining device.

A wheel in accordance with my invention comprises a hub 1, spokes 2, a felly 3, and a band 4 on said felly.

On the band 4 is mounted a rim 5, which may be secured thereon by bolts 6 and nuts 7, the bolts 6 extending through the band 4 and the felly 3 with the heads of said bolts countersunk in the rim 5 and the nuts 7 on the inner ends of said bolts. The rim 5 has side flanges 8 adapted for holding a pneumatic or solid rubber tire 9, and said rim is of greater width than an ordinary rim, so as to protrude from the sides of the felly 3 and thus provide side rings 10.

On the solid rubber tire 9 is placed an annular tread member 11 of considerable width, said member being in the form of a strip of metal bent about the tire with its ends inturned so as to provide lugs or flanges 12, as best shown in Fig. 1, adapted to be connected by bolts 13 and nuts 14. Encircling the bolts 13, between the lugs 12 are coiled expansion springs 15, and the expansive force of these springs maintains the ends of said member 11 normally separated, but permits of the ends or lugs 12 approaching each other when pressure is brought to bear upon the tread member 11.

To close the gap between the lugs 12 of the tread member 11, a plate 16 is mounted on one end of the tread member to extend over the gap on to the opposite end of the tread member, thus preventing stones and other matter from lodging between the lugs 12 and interfering with adjustment thereof.

The tread member 11 is connected to the side rings 10 by a plurality of radially disposed and equally spaced bolts 17 arranged at both sides of the tire 9. The bolts 17 extend through slots 18 in the tread member 11 and have the headed ends thereof connected by cleats 19 on the tread member 11. The inner ends of the bolts are provided with nuts 20 and encircling said bolts between the side rings 10 and tread member 11, are coiled expansion springs 21. The expansive force of the springs 21 maintains the tread member 11 normally distended on the tire 9, but permits of the tread member shifting when pressure is brought to bear thereon. The slots 18 provide sufficient clearance for the bolts 17, when the tread member is shifted and the resiliency of the tire 9 and the spring 17, tends to resist and cushion a load supported by the wheel.

The tread member 11 may be provided with a plurality of detachable spurs 22 which may be distributed on the periphery of the tread member 11 so as to increase the tractive power of said member. The spurs 22 are preferably in the form of conical members having shanks 23 extending through the tread member 11 and the inner ends of the shanks provided with grooves 24. Adapted to engage in the grooves 24 and hold the shanks in engagement with the tread member 11 are resilient arms or springs 25 carried by studs 26 on the inner wall of the tread member 11. The resilient arms or springs 25 can be easily sprung out of engagement with the spur shanks 24 when it is desired to remove said spurs.
In order that the tread member may be used on ordinary wheels that are devoid of the wide rim or side rings, there is shown in Fig. 4, side rings 27 that are bolted or otherwise connected, as at 28, to a felly 29.
In this instance it is necessary to use longer side bolts 30 and longer springs 31, but the same results are attained as in the preferred form of construction.

It is thought that the utility of my invention will be apparent without further description, and while in the drawings there are illustrated the preferred embodiments of the wheel, it is to be understood that the structural elements are susceptible to such variations and modifications as fall within the scope of the appended claim.

What I claim is:—

In a wheel, the combination of a resilient tire, a rim supporting said tire, side rings integral with said rim adjacent the tire, a tread member on said tire in the form of a strip of metal having its ends inturned, bolts and nuts connecting the inturned ends of said tread member, springs on said bolts holding the ends of said tread member normally separated so that said tread member may be contracted about the tire of said wheel, a plate on one end of said tread member extending on to the opposite end of said tread member and bridging the gap between the inturned connected ends of the tread member, bolts connecting said tread member to said side rings with said bolts loose in said tread member, and coiled expansion springs on said bolts between said side rings and said tread member.

In testimony whereof I affix my signature in the presence of a witness.

MICHAEL SCHEDLBAUER.

Witness:
KARL H. BUTLER.